Patented Dec. 6, 1932

1,890,033

UNITED STATES PATENT OFFICE

ALPHONSE GAMS, GUSTAVE WIDMER, AND KARL FREY, OF BASEL, SWITZERLAND, ASSIGNORS TO "SOCIETY OF CHEMICAL INDUSTRY IN BASLE", OF BASEL, SWITZERLAND

MANUFACTURE OF CONDENSATION PRODUCTS FROM FORMALDEHYDE, THIOUREA, AND UREA

No Drawing. Application filed May 31, 1929, Serial No. 367,611, and in Switzerland June 15, 1928.

The copending specification Ser. No. 205,839 which has matured into Patent 1,854,896 relates to clear artificial masses from formaldehyde and thiourea or a mixture of thiourea and urea and process of making same.

One object of said specification consists in condensing formaldehyde with a quantity of urea, or of a mixture of urea and thiourea not greater than that corresponding to 1 molecular proportion of urea for each 2 molecular proportions of formaldehyde at a temperature at about 100° C. up to the stage at which a sample of the reaction mixture yields a precipitate on dilution with water, then adding thiourea or a mixture of thiourea and urea in such a quantity that the total quantity of urea and thiourea present in the mixture amounts to not less than 1 molecular proportion for each 1.6 molecular proportions of formaldehyde, and finally concentrating the mixture and hardening the residue in the usual manner.

This invention is an improvement in or modification of said copending specification.

In the examples of said specification, it is shown that after the subsequent addition of the thiourea or mixture of thiourea and urea, the condensation solution is further treated by directly evaporating it in the presence of a catalyst, and thus converting it into the solid final product.

The present invention is based on the observation that particularly permanent products are obtained by the process in question when the primary condensation solution is not further worked up immediately after the subsequent addition of the thiourea or mixture of thiourea and urea, but only after the greater part of the formaldehyde capable of titration in the solution has already been further bound.

This binding may be effected on the one hand at at least approximately neutral reaction and on the other hand at ordinary or slightly raised temperature.

For example, if there be added to a primary neutralized condensation solution which, when mixed with water, shows even a slight turbidity, approximately 10 per cent. of its weight of thiourea, and the solution is allowed to stand, it is observed that the content of solution in free formaldehyde, which at the time of adding the thiourea amounted to about 6 per cent. by volume, has been reduced after some days to a fraction of 1 per cent. By slightly heating, the binding can be accelerated. Unexpectedly, the solubility of the condensation product remains unchanged; that is to say the solution now still gives, as before, only a slight turbidity when mixed with water. On the other hand, if the operation is conducted in an acid or feebly alkaline medium, the condensation or polymerization proceeds gradually and there are obtained hydrophobe condensation solutions, which after standing for a long time finally gelatinize when acid or yield a precipitate of flocks when alkaline. The solution, which is kept neutral, however, remains clear and has a very great stability. After standing for a month, the solution maintains its viscosity. If the solution is evaporated and the residue worked up in a suitable manner to form a varnish, the unexpected fact is disclosed that the coatings made therewith, even without addition of a catalyst, harden to a condition which is quite fast to water. A further practically important advantage is that the manufacture and use of the apparatus employed, such as casks, spraying machines, brushes, casting machines or the like, can be very easily cleaned by mere treatment with hot water, which is not possible when hydrophobe varnish is used.

The following examples illustrate the invention, the parts being by weight:—

*Example 1*

120 parts of urea are dissolved in 334 parts of formaldehyde of 36 per cent. by volume and the solution is mixed with 30 parts of blood charcoal and filtered. The completely clear solution is heated for about 6 hours at 98° C. in an autoclave having a stirrer. The condensation product is colorless and when mixed with water becomes slightly turbid. It yields with alcohol a thick precipitate. Its reaction is quite feebly acid. It is exactly neutralized to litmus by means of dilute caustic soda solution and then mixed with 45 parts of thiourea which dissolves during stirring for a short time. After standing for 2 days at the room temperature, the content of formaldehyde which can be titrated has been reduced from about 6 per cent. by volume to about ½ per cent. by volume. The viscosity and the appearance of the solution have hardly changed and the solution can now be evaporated and worked up into a varnish or artificial material in some suitable manner.

Example 2

In 300 parts of the condensation solution obtained as described in Example 1, which has been neutralized with caustic soda solution, there are introduced 30 parts of thiourea and the solution thus obtained is heated for 2 hours on the water-bath at about 60° C. The content of formaldehyde that can be titrated has been reduced from about 6 per cent. by volume to about 0.8 per cent. by volume. The solubility and viscosity of the solution remains unchanged as compared with that of the original condensation solution. The solution is worked up as described in Example 1.

The same result is of course also obtained with solutions of condensation products, in the manufacture of which in the first phase instead of urea mixtures of urea and thiourea conveniently containing a preponderant proportion of urea and/or in the second phase instead of thiourea mixtures of thiourea and urea conveniently containing a preponderant proportion of thiourea are employed.

What we claim is:—

1. In the process for the manufacture of clear condensation products from urea, thiourea and formaldehyde, as obtainer by condensing formaldehyde with a quantity of urea not greater than that corresponding to 1 molecular proportion of urea for each two molecular proportions of formaldehyde at a temperature of about 100° C. up to the stage at which a sample of the reaction mixture yields a precipitate on dilution with water, neutralizing the solution, then adding thiourea in such a proportion that the total quantity of urea and thiourea present in the mixture amounts to not less than 1 molecular proportion for each 1.6 molecular proportions of formaldehyde, the feature of allowing the resulting solution, before its being further worked up, to stand until at least the greater part of the free aldehyde has been bound.

2. In the process for the manufacture of clear condensation products from urea, thiourea and formaldehyde, as obtained by condensing formeldehyde with a quantity of urea not greater than that corresponding to 1 molecular proportion of urea for each two molecular proportions of formaldehyde at a temperature of about 100° C. up to the stage at which a sample of the reaction mixture yields a precipitate on dilution with water, neutralizing the solution, then adding thiourea in such a proportion that the total quantity of urea and thiourea present in the mixture amounts to not less than 1 molecular proportion for each 1.6 molecular proportions of formaldehyde, the feature of allowing the resulting solution, before its being further worked up, to stand at a temperature slightly above room temperature until at least the greater part of the free aldehyde has been bound.

3. In the process for the manufacture of clear condensation products from urea, thiourea and formaldehyde, as obtained by condensing formaldehyde with a quantity of urea not greater than that corresponding to 1 molecular proportion of urea for each two molecular proportions of formaldehyde at a temperature of about 100° C. up to the stage at which a sample of the reaction mixture yields a precipitate on dilution with water, then adding thiourea in such a proportion that the total quantity of urea and thiourea present in the mixture amounts to not less than 1 molecular proportion for each 1.6 molecular proportions of formaldehyde, the feature of allowing the resulting solution, before its being further worked up, to stand at neutral reaction until at least the greater part of the free aldehyde has been bound.

4. In the process for the manufacture of clear condensation products from urea, thiourea and formaldehyde, as obtained by condensing formaldehyde with a quantity of urea not greater than that corresponding to 1 molecular proportion of urea for each two molecular proportions of formaldehyde at a temperature of about 100° C. up to the stage at which a sample of the reaction mixture yields a precipitate on dilution with water, then adding thiourea in such a proportion that the total quantity of urea and thiourea present in the mixture amounts to not less than 1 molecular proportion for each 1.6 molecular proportions of formaldehyde, the feature of allowing the resulting solution, before its being further worked up, to stand at neutral reaction and at a temperature slightly above room temperature until at least the greater part of the free aldehyde has been bound.

In witness whereof we have hereunto signed our names this 18th day of May 1929.

ALPHONSE GAMS.
GUSTAVE WIDMER.
KARL FREY.